US012762135B2

(12) United States Patent
Gau

(10) Patent No.: US 12,762,135 B2
(45) Date of Patent: Oct. 13, 2026

(54) METHOD FOR RETRIEVING TIME-SERIES DATA SETS FROM A PROCESS DATABASE SYSTEM OF AN INDUSTRIAL PLANT

(71) Applicant: BASF SE, Ludwigshafen (DE)

(72) Inventor: Sebastian Gau, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 18/268,685

(22) PCT Filed: Dec. 21, 2021

(86) PCT No.: PCT/EP2021/087067
§ 371 (c)(1),
(2) Date: Jun. 21, 2023

(87) PCT Pub. No.: WO2022/136418
PCT Pub. Date: Jun. 30, 2022

(65) Prior Publication Data
US 2024/0184795 A1 Jun. 6, 2024

(30) Foreign Application Priority Data
Dec. 22, 2020 (EP) .................................... 20216682

(51) Int. Cl.
*G06F 16/2458* (2019.01)
*G06F 16/2457* (2019.01)

(52) U.S. Cl.
CPC .... *G06F 16/2477* (2019.01); *G06F 16/24578* (2019.01)

(58) Field of Classification Search
CPC ....................... G06F 16/2477; G06F 16/24578
See application file for complete search history.

(56) References Cited

U.S. PATENT DOCUMENTS 10,860,450 B1 * 12/2020 Dageville ............. G06F 11/327
11,363,035 B2 6/2022 Rayapeta et al.
(Continued)

FOREIGN PATENT DOCUMENTS

CN 110347706 A 10/2019
EP 3550447 A1 10/2019
(Continued)

OTHER PUBLICATIONS

International Search Report and Written Opinion for Application No. PCT/EP2021/087067 mailed May 5, 2022, 8 pages.
(Continued)

*Primary Examiner* — Sherief Badawi
*Assistant Examiner* — Earl Levi Elias
(74) *Attorney, Agent, or Firm* — Lowenstein Sandler LLP

(57) ABSTRACT

The invention refers to a method for retrieving time-series data sets from a database system of an industrial plant. The method 200 comprises providing 210 request queries indicative of time-dependent data values by indicating a tag and a start time and end time of the respective time-series data set, and providing 220 responsiveness scores for the provided request queries, wherein a respective responsiveness score is indicative of an expected responsiveness of the process database system with respect to a tag. Further, bulk queries are generated 230 based on the responsiveness scores comprising queries for requesting at least a part of the time-dependent data values, wherein all time-dependent data values of all provided request queries are requested by the bulk queries. The bulk queries are transmitted 240, and the time-dependent data values are retrieved 250 from the process database system. This allows for an effective and computationally inexpensive retrieval of data.

15 Claims, 4 Drawing Sheets

(56) References Cited

U.S. PATENT DOCUMENTS

| | | | | |
|---|---|---|---|---|
| 11,460,818 | B2 | 10/2022 | Seki et al. | |
| 2003/0158842 | A1* | 8/2003 | Levy | G06F 16/24532 |
| 2007/0130171 | A1* | 6/2007 | Hanckel | G06F 16/2477 |
| 2008/0126408 | A1* | 5/2008 | Middleton | G06F 16/2477 |
| 2010/0114970 | A1* | 5/2010 | Marin | G06F 16/951 707/E17.014 |
| 2011/0282836 | A1 | 11/2011 | Laure | |
| 2013/0290242 | A1 | 10/2013 | Suzuki | |
| 2014/0379904 | A1 | 12/2014 | Shimasaki et al. | |
| 2016/0371363 | A1 | 12/2016 | Muro et al. | |
| 2017/0103103 | A1* | 4/2017 | Nixon | G06F 16/2452 |
| 2017/0124487 | A1* | 5/2017 | Szeto | G06F 11/1448 |
| 2017/0316003 | A1 | 11/2017 | Avihay et al. | |

FOREIGN PATENT DOCUMENTS

| | | | |
|---|---|---|---|
| JP | 2016220213 | A | 12/2016 |
| JP | 2018151877 | A | 9/2018 |
| WO | 2012020456 | A1 | 2/2012 |
| WO | 2013069078 | A1 | 5/2013 |
| WO | 2015145626 | A1 | 10/2015 |

OTHER PUBLICATIONS

Office Action with English Translation for Chinese Patent Application No. 202180086634.1 dated Oct. 24, 2025, 22 pages.

Office Action with English Translation for Japanese Patent Application No. 2023538106 dated Sep. 30, 2025, 6 pages.

* cited by examiner

METHOD FOR RETRIEVING TIME-SERIES DATA SETS FROM A PROCESS DATABASE SYSTEM OF AN INDUSTRIAL PLANT

CROSS-REFERENCE TO RELATED APPLICATION(S)

The present application is a national phase entry under 35 U.S.C. § 371 of International Application No. PCT/EP2021/087067, filed on Dec. 21, 2021, which claims priority to European Patent (EP) application No. 20216682.3 filed on Dec. 22, 2020. The contents of these applications are hereby incorporated by reference herein in their entirety.

FIELD OF THE INVENTION

The invention relates to a computer implemented method, a computing device, a data retrieval system and a computer program product for retrieving time-series data sets from a process database system of an industrial plant.

BACKGROUND OF THE INVENTION

In modern industrial production processes a plurality of sensors are provided that monitor the production of a product in an industrial plant. The data generated by the plurality of sensors is generally stored in form of time-series data sets in a process database system, sometimes called historian, of the industrial plant. Such time-series data sets are each associated with a tag which can be regarded as an identifier for a time-series data set and comprises a series of time-dependent data values, for instance, measurements of one or more sensors of the industrial plant. Such time-series data sets often comprise time-dependent data values of many years during which the sensor has been measuring parameters of the industrial production plant. Moreover, it is very common that the process database systems on which the time-series data sets are stored are not updated to a current technology level but are kept working on their current technology level as legacy systems. However, today it is often desirable to use the plurality of data provided within the time-series data sets in other contexts, for instance, for big data mining, a further analysis of the data in higher ranking computational systems, like an enterprise control system, etc. For this purpose, the time-series data sets have to be retrieved from the process database system as efficiently as possible while taking into account possible restrictions of the process database system, for instance, due to its technology level, etc. In particular, simply requesting such huge amounts of time-dependent data values will in most cases overload a legacy process database system. Thus, it would be advantageous if a method were provided that allows for an effective and computationally inexpensive retrieval of time-series data sets from a process database system of an industrial plant.

SUMMARY OF THE INVENTION

It is an object of the present invention to provide a computer implemented method, a computing device, a retrieval system and a computer program product that allow for an effective and computationally inexpensive retrieval of time-series data sets from a process database system of an industrial plant. Moreover, it is an object of the present invention to enable an effective one-time or continuous extraction of time-series data sets from a legacy system, in order to provide the time-series data to a technologically superior system such that a big data analysis of the retrieved time-series data is enabled.

In a first aspect of the present invention a computer implemented method for retrieving time-series data sets from a process database system of an industrial plant is presented, wherein a respective time-series data set is associated with a respective tag and comprises a respective series of time-dependent data values, wherein the method comprises i) providing request queries for requesting time-dependent data values of the time-series data sets, wherein a respective request query indicates respective requested time-dependent data values by indicating a) a respective request tag associated with a respective time-series data set and b) a respective start time and a respective end time of the time-dependent data values of the respective time-series data set associated with the respective request tag, ii) providing responsiveness scores of the process database system for the provided request queries, wherein a respective responsiveness score is indicative of an expected responsiveness of the process database system with respect to a respective request tag indicated by the respective provided request query, iii) generating bulk queries based on the responsiveness scores such that a) a respective bulk query comprises queries for requesting at least a part of the requested time-dependent data values of one or more of the provided request queries and b) all requested time-dependent data values of all provided request queries are requested by the bulk queries, iv) transmitting the bulk queries to the process database system, and v) retrieving time-dependent data values from the process database system in response to the bulk queries.

Since bulk queries are generated based on the responsiveness scores and the time-dependent data values are retrieved utilizing the bulk queries, an expected responsiveness of the process database system for each tag can be taken into account and the bulk queries can be optimized for a very effective and computationally inexpensive retrieval of the requested time-dependent data values. Moreover, the method allows for a maximizing of time-dependent data values throughput when retrieving these from a process database system while minimizing the stress on the process database system.

The time-series data sets stored on the process database system of the industrial plant can refer to any series of time-dependent data values that are associated with a respective tag. Preferably, the respective time-series data sets comprise time-dependent data values that refer to measurements of a sensor provided in the industrial plant for monitoring a production process of the industrial plant. In this preferred embodiment, the tag associated with the time-dependent data values can be indicative of an identity of the sensor of the industrial plant that has provided the respective time-dependent data values. For example, a time-series data set can refer to a time-series of temperature measurements provided by a temperature sensor in a chemical reactor during the production of a specific product. The temperature sensor can be, for instance, adapted to provide a temperature measurement every few seconds that is stored on the process database system in association with a tag indicative of the identity of the temperature sensor and thus generates a respective time-series data set. However, in other embodiments the series of time-dependent data values can also refer to data values measured not only by one sensor but by a plurality of sensors, wherein in this case the tag associated with the time-dependent data values can be indicative of the plurality of sensors or can be completely independent of the source of the time-dependent data values.

Generally, a time-series data set comprises in addition to the time-dependent data values also timestamps associated with the time-dependent data values to indicate the time at which the time-dependent data values have been measured. Moreover, optionally a time-series data set can further comprise a quality value associated with each time-dependent data value of the time-series data set, where the quality value can be indicative of a quality of the measurement of the respective time-dependent data value. Without limiting the generality or scope of the present teachings, in an embodiment, the time-series data set can refer to an in-order insert time-series data set that is defined by the most recently inserted, i.e. stored, time-dependent data value associated with the time-series data set being the time-dependent data value associated with the most recent timestamp compared with all other timestamps associated with already stored time-dependent data values. Thus, an in-order insert time-series data set can be regarded as referring to a time-series data set in which all time-dependent data values are stored subsequently, i.e. in order of the associated timestamps. Thus, the newest time-dependent data value is stored without belatedly inserting time-dependent data values associated with timestamps indicating that the measurement has been performed before an already stored time-dependent data value.

In a first step, the method comprises providing request queries for requesting time-dependent data values of the time-series data sets. The providing of the request queries can, for instance, refer to receiving the request queries from a storage on which the request queries are already stored and then providing the same. However, the providing of the request queries can also refer to a receiving of the request queries from a user input and then to providing the request queries based on the input of the user. Generally, the request queries refer to queries that request the time-dependent data values of a time-series data set, for instance, for transferring the time-dependent data values to another process system or for a further analysis of the time-dependent data values.

Generally, a request query indicates the desired requested time-dependent data values by indicating a) a respective request tag associated with the respective time-series data set comprising the requested time-dependent data values, and b) a respective start time and a respective end time of the time-dependent data values of the respective time-series data set. For example, a respective request query can directly comprise the tag or an identifier of the tag for indicating the respective request tag and can further comprise some time identifier that is indicative of the respective start time and the respective end time. For example, the time identifier can refer to a date and time as respective start time, and a respective date and time as respective end time. However, the time identifier can also refer to a date and time as respective start time and can further indicate a time duration, for instance, referring to a number or hours, days, months, years, etc. that allows together with the respective start time to identify the respective end time. Moreover, the time identifier can also be provided in any other manner that allows for an identification of a respective start time and a respective end time for a time-series data set, for instance, can also refer to a computer clock time, a timestamp used for encoding the time associated with the specific time-dependent data value, etc. Generally, the respective request end time and start time refer to a time indicated by the timestamps with which the time-dependent data values are associated. Thus, the respective start time and respective end time indicate which of the time-dependent data values of a time-series data set indicated by the request tag shall be retrieved. Thus, each request query is indicative of the time-dependent data values of a time-series data set that shall be retrieved.

In a second step, the method comprises providing responsiveness scores of the process database system for the provided request queries. A respective responsiveness score is generally indicative of an expected responsiveness of the process database system with respect to a respective request tag indicated by the respective provided request query. For example, the responsiveness scores can be stored associated with the respective tag on a persistency database and can then be provided based on the respective request tags. Generally, it can be regarded that an expected responsiveness of the process database system refers to an expected amount of time-dependent data values of the respective tag that can be retrieved from the process database system in a predetermined time period. Since, however, the actual responsiveness of the process database system might depend on a plurality of factors, for instance, a current workload of the process database system, a current capacity of an interface between the process database system, a system to which the time-dependent data values are transferred, etc., the respective responsiveness score is only indicative of an expected responsiveness of the process database system.

In a preferred embodiment, a respective responsiveness score is determined based on a synchronization state of a respective request tag and/or a data density of a time-series data set associated with the respective request tag. A synchronization state of the respective request tag is indicative of which time-dependent data values of the associated time-series data set has already been retrieved from the process database system and which time-dependent data values still need to be retrieved from the process database system to get a complete time-series data set for this request tag. For example, the synchronization state can refer to an end time of the last request query referring to the respective request tag. However, the synchronization state can also refer to a time period from a time that can be regarded as now to the last retrieved time-dependent data value of the respective request tag.

Preferably, the method further comprises determining a request start time of a request query based on a synchronization state of the request tag indicated by the request query. In particular, it is preferred that the request start time is automatically determined. Moreover, it is preferred that the method comprises updating the synchronization state of a request tag after a predetermined time period and, if it is determined that time-dependent data values are associated with the request tag that have not yet been retrieved, a request query is generated for requesting the not yet retrieved time-dependent data values. This allows to keep the retrieved time-dependent data values up-to-date.

A data density of a time-series data set refers to the amount of time-dependent data values that are stored during a predetermined time period with respect to a specific tag. Different tags, that each can refer to a sensor, can comprise different data densities, for instance, caused by different measurement frequencies of sensors. For example, a temperature sensor might measure a temperature in a chemical reactor every minute and thus produce a time-series data set with a data density of 60 time-dependent data values per hour, whereas a pressure sensor in a chemical reactor might only measure a pressure every half hour and thus produce a time-series data set with a data density of 2 time-dependent data values per hour. Moreover, in other examples sensors can even provide time-dependent data values every few seconds and thus provide even higher data densities. Based on the synchronization state and/or the data density of the respective request tag, an expected responsiveness of the process database system and thus a respective responsiveness score can be determined. For example, predetermined rules can be used to determine the respective responsiveness score from the synchronization state and/or the data density, wherein the rules can be based on the experience with the process database system or can be based on theoretical considerations. For example, the rules can define that the responsiveness score and thus the respective expected responsiveness of the process database system is higher if the data density is lower and the synchronization state indicates that only very few time-dependent data values are missing of the time-series data set associated with the respective request tag. The respective expected responsiveness score can then also be lower if the data density associated with the respective tag is higher and/or the synchronization state of the respective request tag indicates a long time period for which no time-dependent data values have been retrieved for the respective request tag. Moreover, in a preferred embodiment the respective responsiveness score is only determined based on the data density, in particular, determined as equal to the data density of the time-dependent data set associated with the respective request tag.

Determining the respective responsiveness score based on a synchronization state and/or the data density allows for a computationally very inexpensive determination of the responsiveness score. Moreover, the synchronization state and/or the data density allow for a very good estimation of the responsiveness of the process database system, and thus allow for a generation of bulk queries that allow for a very effective retrieval of the time-dependent data values.

However, in other embodiments the responsiveness scores can also be determined based on a past experience with respect to the responsiveness of the process database system with respect to a respective request tag. For example, if time-dependent data values associated with the respective request tag have previously already been retrieved from the process database system, the responsiveness of the process database system in this previous retrieval can be measured and used as basis for determining a responsiveness score, for example, it can be expected that the process database system will have the same responsiveness with respect to the respective request tag as during the previous retrieval. Moreover, in case no previous time-dependent data values have been retrieved for a respective request tag and further no data density and no synchronization state for the respective request tag are known, the responsiveness score can also refer to a predetermined base responsiveness score. Such a predetermined base responsiveness score can refer, for instance, to an average responsiveness of the process database system as measured in previous time-dependent data value retrievals of other tags, or can be provided based on an input of a user, or can be referred to a basic value for the responsiveness score implemented as starting point for all respective request tags for which no further information is provided.

In a further step, the method comprises generating bulk queries based on the responsiveness scores. Generally, a bulk query comprises queries for requesting at least a part of the requested time-dependent data values of the one or more of the provided request queries. Thus, a bulk query can also be regarded generally as a query targeting time-dependent data values of multiple tags. Moreover, all generated bulk queries together comprise queries for requesting all requested time-dependent data values of all provided requested queries. Generally, a query of a bulk query only refers to one request tag, i.e. a query of a bulk query is defined in the same way as a request query and is indicative of a respective request tag and a respective start and end time. However, the respective start time and the respective end time of a query indicating a request tag can be different from the request start and end time of the request query associated with the request tag. Thus, the generating of the bulk queries can be regarded as a sorting of the requested time-dependent data values into queries that form the bulk queries that are more suitable for effectively retrieving the time-dependent data values of the provided request queries than the provided request queries themselves. In particular, the responsiveness score allows to estimate an expected responsiveness of the process database system and thus allows to generate bulk queries that comprise queries that allow for the most effective retrieval of the time-dependent data values. For example, the generating of a bulk query can comprise applying predetermined rules on how the bulk queries shall be generated based on the responsiveness score. Such rules can, for instance, indicate that a bulk query shall comprise queries for requesting time-dependent data values associated with respective request tags with similar responsiveness scores. However, the rules can also indicate that for a process database system it will be more advantageous if the bulk queries comprise queries for requested time-dependent data values associated with respective request tags comprising different responsiveness scores. For instance, the rules can indicate that half of the queries shall refer to time-dependent data values of respective request tags with a high responsiveness score and the other half of the queries shall refer to time-dependent data values of respective request tags with low responsiveness scores. However, also other more complex rules can be applied for generating the bulk queries based on the responsiveness score.

Further, the method comprises transmitting the generated bulk queries to the process database system and then retrieving the time-dependent data values from the process database system in response to the bulk queries. For example, the time-dependent data values that are retrieved can be transmitted from the process database system to other storage and/or processing systems for storing and/or processing the retrieved time-dependent data values.

In a preferred embodiment, the generating of the bulk queries comprises determining, for each bulk query, queries comprising at least a part of the time-dependent data values indicated by the request queries such that a pre-configurable maximum data point count is not exceeded during the retrieving of the time-dependent data values of the bulk query. The maximum data point count refers to a maximum of time-dependent data values that can be retrieved per query from the process database system. Thus, the bulk queries can be generated such that, when retrieving the time-dependent data values of the bulk query, the maximum data point count is not exceeded.

Since this threshold is taken into account when generating the bulk queries, it can be ensured that during the retrieval of the time-dependent data values based on the bulk queries no time-dependent data values are lost, i.e. are not retrieved due to the maximum data point count of the process database system having already been reached by the bulk query. Thus, the requested time-dependent data values of the provided request queries can be retrieved very effectively and accurately from the process database system.

In an embodiment, the generating of a bulk query comprises determining the queries of a bulk query such that all determined queries of the bulk query comprise the same start time. Preferably, the generating of the bulk queries comprises sorting the respective request queries based on the start time of the respective request queries, which can also be regarded as sorting the respective request queries based on their synchronization state. Based on this sorting, the bulk queries referring to at least a part of the requested time-dependent data values of the provided request queries can be generated such that the resulting queries of the bulk query comprise the same start time. However, the queries of a bulk query can also be generated without previously sorting the respective request queries. It is further preferred that the generating of a bulk query comprises determining the queries of a bulk query such that all determined queries of the bulk query comprise the same end time. Also for this it is preferred to generate the bulk queries based on sorted respective request queries, as described above. However, also without a sorting the bulk queries can be generated accordingly.

Providing the queries of a bulk query with the same start time and optionally also with the same end time has the advantage to significantly reduce a number of accesses to the process database system, since data for multiple tags can be read in one process database system access compared to a bulk query containing individual start and end time for every query, i.e. tag. Thus, the execution speed of the bulk query can be greatly increased, resulting in a better responsiveness. Moreover, the amount of query text, for instance, provided in structured query language (SQL), transferred to the process database system can be greatly reduced. For example, if a bulk query comprises 1000 queries and if each of these queries had a different start and end time, 1000 start and end times of the bulk query would have to be specified leading to a large communication overhead. Moreover, in some cases there can be an upper limit to how many characters a query text is allowed to contain for a specific process database system. Such problems with the bulk query text can thus be avoided when providing the queries of the bulk query with the same start times and optionally the same end times.

In a preferred embodiment, the start time of the determined queries of a bulk queries is determined such that for at least one request query duplicated time-dependent data values are retrieved when retrieving the time-dependent data values in response to the bulk query. Duplicated time-dependent data values refer to time-dependent data values that have already been retrieved during a previous request query referring to the same request tag. Accordingly, duplicated time-dependent data values have already been transmitted for further processing and storing. However, determining a start time of a query of a bulk query such that duplicated time-dependent data values are retrieved allows a generating of a bulk query comprising queries that comprise the same start time even in cases in which the start times of the respective request queries are all different. For this embodiment, it is then preferred that the method further comprises, after retrieving the time-dependent data values in response to the bulk queries comprising duplicated time-dependent data values for at least on request query, deduplicating the retrieved time-dependent data values of the request query. Deduplicating the retrieved time-dependent data values of a request query can refer, for instance, to determining the duplicated time-dependent data values and then removing the duplicated time-dependent data values before storing and/or processing the retrieved time-dependent data values further in connection with already previously retrieved time-dependent data values associated with the respective tag. The duplicated time-dependent data values can, for instance, be determined based on a known synchronization state of the respective requested tag and/or by comparing the timestamps with which each time-dependent data value of the respective request tag is associated with the timestamps of already retrieved time-dependent data values of the respective request tag.

Although the bulk queries in this embodiment can contain duplicated time-dependent data values and thus request more time-dependent data values than necessary for the respective request queries, the advantages of using the same start and optionally end times, as already described above, are much higher than the disadvantage of having to cope with the duplicated time-dependent data values.

In a preferred embodiment, the generating of the bulk queries is further based on configurable partitioning parameters determining a general setup of each bulk query. The configurable partitioning parameters refer to parameter that can be pre-set and applied to all bulk queries. Generally, the configurable partitioning parameters determine the general setup of the bulk queries. In a preferred embodiment, the configurable partitioning parameters indicate at least one of a maximum number of request tags, a maximum number of time-dependent data values, a minimum time frame for a query and a maximum time frame for a query that are requestable by a bulk query. Moreover, the partitioning parameters can also refer to parameters indicative of the processing of the bulk query. For example, the partitioning parameters can also be indicative of a maximum number of retries for a query, a maximum processing cycle run time, a maximum initial load time for the query, etc. Such partitioning parameters are preferably preconfigured, for instance, based on knowledge of the setup of the process database system, experience of a user, etc. However, the partitioning parameters can also be configured depending on an experience with the retrieval of previous bulk queries. For example, if during the retrieval of a previous bulk query errors occur that do not allow to retrieve all requested time-dependent data values, the partitioning parameters can be reconfigured before generating the next bulk queries, for instance, the maximum number of queries allowed in a bulk query can be decreased.

This has the advantage that the bulk queries can be adapted even more to the respective setup of the process database system from which the time-dependent data values shall be retrieved. Moreover, since such general setup parameters like the partitioning parameters for the bulk queries do not have to be determined anew each time a bulk query shall be generated but are generally set for all bulk queries, the generation of the bulk queries can be performed more effectively and computationally inexpensive.

In an embodiment, the method further comprises determining the responsiveness score for a request tag associated with a request query, for which time-dependent data values are retrieved, during or after the retrieving of the time-dependent data values and storing the responsiveness score to be used for future request queries requesting the request tag. In particular, since during the retrieval of the time-dependent data values an actual responsiveness of the process database system can be measured, such measurements can be utilized to more accurately determine a responsiveness score. In particular, it is expected that an actual responsiveness of the process database system will generally be similar to a previous responsiveness. Accordingly, a responsiveness score determined based on a real responsiveness of the process database system can be stored, for instance, on a persistency database, and can then be provided as responsiveness score when a provided request query refers to a respective request tag. Preferably, the responsiveness score is determined by measuring an amount of time-dependent data values associated with the request tag that are retrieved in a predetermined time period during the retrieval of the time-dependent data values of the request tag.

Determining the responsiveness score based on actual measurements of an actual responsiveness of the process database system with respect to a respective request tag allows for a very accurate estimation of a future responsiveness of the process database system for the request tag. Accordingly, a more accurate estimation, i.e. responsiveness score, can be provided for each respective request tag for which already time-dependent data values have been retrieved from the process database system. This allows, hence, for a further optimization of the generated bulk queries and thus for a more effective retrieval of the time-dependent data values.

In an embodiment, the method further comprises determining, during the retrieving of the time-dependent data values of the bulk queries, whether a failure has occurred, wherein, when it is determined that a failure has occurred that is associated with at least one query of the bulk queries, the method comprises providing the time-dependent data values requested by the query as new request query to the step of determining a bulk query. Thus, it can be ensured that also in case of failures all requested time-dependent data values are eventually retrieved from the process database system. Moreover, since the time-dependent data values for which the retrieval has failed are again requested as part of a bulk query, and not, for instance, in an independent process, also such failures of retrieving time-dependent data values can be dealt with very effectively without further computational expense.

In a further aspect of the invention, a computing device for retrieving time-series data sets from a process database system of an industrial plant is presented, wherein a respective time-series data set is associated with a respective tag and comprises a respective series of time-dependent data values, wherein the computing device comprises i) a query providing unit for providing request queries for requesting time-dependent data values of the time-series data sets, wherein a respective request query indicates respective requested time-dependent data values by indicating a) a respective request tag associated with a respective time-series data set and b) a respective start time and a respective end time of the time-dependent data values of the respective time-series data set associated with the respective request tag, ii) a responsiveness score providing unit for providing responsiveness scores of the process database system for the provided request queries, wherein a respective responsiveness score is indicative of an expected responsiveness of the process database system with respect to a respective request tag indicated by the respective provided request query, iii) a bulk query generating unit for generating bulk queries based on the responsiveness scores such that a) a respective bulk query comprises queries for requesting at least a part of the requested time-dependent data values of one or more of the provided request queries and b) all requested time-dependent data values of all provided request queries are requested by the bulk queries, iv) a transmitting unit for transmitting the bulk queries to the process database system, and v) a retrieving unit for retrieving time-dependent data values from the process database system in response to the bulk queries.

In a further aspect of the invention, a data retrieval system in connection with a process database system is presented, wherein the data retrieval system comprises i) a persistency database adapted for storing a plurality of responsiveness scores of the process database system, wherein each responsiveness score is associated with a tag, and ii) a computing device as described above, wherein the query providing unit is adapted to receive the responsiveness score from the persistency database and to provide the received responsiveness score.

In a further aspect of the invention, a computer program product for retrieving time-series data sets from a process database system of an industrial plant is presented, wherein the computer program product comprises program code means causing a computing device as described above to execute a method as described above.

It shall be understood that the method as described above, the computing device as described above, the data retrieval system as described above and the computer program product as described above have similar and/or identical preferred embodiments, in particular, as defined in the dependent claims.

It shall be understood that a preferred embodiment of the present invention can also be any combination of the dependent claims or above embodiments with the respective independent claim.

These and other aspects of the present invention will be apparent from and elucidated with reference to the embodiments described hereinafter.

BRIEF DESCRIPTION OF THE DRAWINGS

In the Following Drawings

DETAILED DESCRIPTION OF EMBODIMENTS

Figure 1:
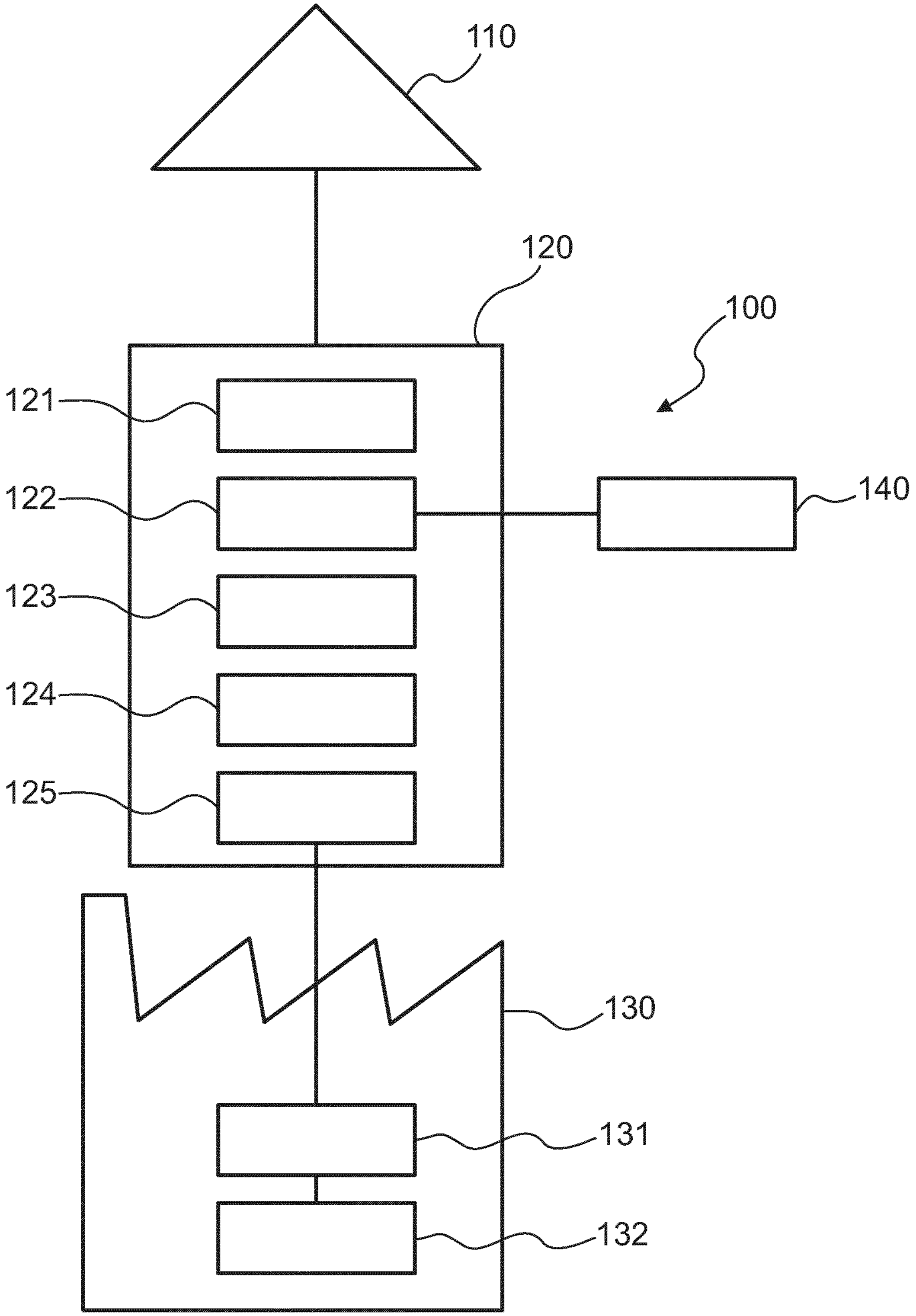
FIG. 1 shows schematically and exemplarily an embodiment of a data retrieval system comprising a computing device for retrieving time-series data sets from a process database system of an industrial plant.

FIG. 1 shows schematically and exemplarily a data retrieval system 100 comprising a computing device 120 for retrieving time-series data sets from a process database system 131 of an industrial plant 130 and a persistency database 140.

Generally, the industrial plant 130, can refer to any technical infrastructure that is used for an industrial purpose. The industrial purpose may be manufacturing or processing of one or more industrial products, i.e., a manufacturing process or a processing performed by the industrial plant. For example, the industrial purpose can refer to the production of a specific product. The specific product can, for example, be any physical product such as a chemical, a biological, a pharmaceutical, a food, a beverage, a textile, a metal, a plastic, or a semiconductor. Additionally or alternatively, the specific product can even be a service product such as electricity, heating, air-conditioning, waste treatment such as recycling, chemical treatment such as breakdown or dissolution, or even incineration, etc. Accordingly, the industrial plant 130 may be one or more of a chemical plant, a process plant, a pharmaceutical plant, a fossil fuel processing facility such as an oil and/or a natural gas well, a refinery, a petrochemical plant, a cracking plant, and the like. The industrial plant 130 can even be any of a distillery, an incinerator, or a power plant. The industrial plant 130 can even be a combination of any of the examples given above.

For performing a production process the industrial plant 130 comprises a technical infrastructure which can be controlled by control parameters implemented by a process control system into the technical infrastructure. The technical infrastructure may comprise equipment or process units such as any one or more of a heat exchanger, a column such as a fractionating column, a furnace, a reaction chamber, a cracking unit, a storage tank, a precipitator, a pipeline, a stack, a filter, a valve, an actuator, a transformer, a circuit breaker, a machinery e.g., a heavy duty rotating equipment such as a turbine, a generator, a pulverizer, a compressor, a fan, a pump, a motor, etc. Moreover, the industrial plant 130 typically comprises a plurality of sensors 132 that allow to measure operational parameters of the technical infrastructure. The measured operational parameter are then stored on a process database system 131 of the industrial plant 130. Further, the operational parameters can also be utilized by the process control system for controlling the production process in the industrial plant 130. The operational parameters measured by the sensors 132 may relate to various process parameters and/or parameters related to the equipment or the process units. For example, sensors may be used for measuring a process parameter such as a flowrate within a pipeline, a level inside a tank, a temperature of a furnace, a chemical composition of a gas, etc., and some sensors can be used for measuring vibration of a turbine, a speed of a fan, an opening of a valve, a corrosion of a pipeline, a voltage across a transformer, etc. The difference between these sensors cannot only be based on the parameter that they sense, but can even be based on the sensing principle that the respective sensor uses. Some examples of sensors based on the parameter that they sense may comprise: temperature sensors, pressure sensors, radiation sensors such as light sensors, flow sensors, vibration sensors, displacement sensors and chemical sensors such as those for detecting a specific matter such as a gas. Examples of sensors that differ in terms of the sensing principle that they employ may, for example, be: piezo-electric sensors, piezoresistive sensors, thermocouples, impedance sensors such as capacitive sensors and resistive sensors, and so forth.

The sensors 132 generally measure time-dependent data values, i.e. data values that are associated with the specific time at which they have been measured by a sensor 132. It is common to store these time-dependent data values measured by a sensor 132 in form of a time-series data set on the process database system 131. The process database system 131 can refer, for instance, to a storage comprising dedicated hardware and/or software for storing time-series data sets. However, the process database system 131 can also refer to a general storage or to any other computing system that, inter alia, allows a storage of time-series data sets. Each time-series data set stored on the process database system 131 is associated with a tag which can be regarded as an identifier not only of the respective time-series data set but optionally also of the sensor 132 from which the time-dependent data values of the respective time-series data set are measured. Moreover, each respective time-series data set associated with a respective tag comprises the time-dependent data values stored together with timestamps indicating the time at which a respective time-dependent data value has been measured. Optionally, the respective time-series data set can also comprise a quality value for each respective time-dependent data value indicating a quality of the measurement of the respective time-dependent data value. Thus, the process database system 131 stores, preferably for each sensor 132 of the industrial plant 130, a respective time-series data set which is continuously updated each time a new time-dependent data value is measured by the sensor 132. Accordingly, based on the respective time periods between measurements provided by a sensor 132, each time-series data set comprises a different data density. For example, a temperature sensor can measure the temperature every minute and thus will comprise a data density of 60 data values per hour, whereas a pressure sensor might measure the pressure every ten minutes and thus will comprise a data density of 6 data values per hour.

Generally, the industrial plant 130 can be integrated into an enterprise control system 110 for managing and controlling the production performed by the industrial plant 130. For managing and controlling of the industrial plant 130, it is often desirable to retrieve measurement data provided by the sensors 132 to the process database system 131 such that the retrieved data can be further processed by other dedicated and often more complex management and controlling systems like the enterprise control system 110. For retrieving the time-series data sets provided in the process control system 131, the data retrieval system 100 is provided. After having retrieved the time-series data sets, the data retrieval system 100 can then be adapted, for instance, to provide the retrieved time-series data sets to the enterprise control system 110. The data retrieval system 100 comprises a computing device 120 and a persistency database 140. The computing device 120 comprises a query providing unit 121, a responsiveness score providing unit 122, a bulk query generating unit 123, a transmitting unit 124 and a retrieving unit 125.

The query providing unit 121 is adapted to provide request queries for requesting time-dependent data values of the time-series data sets. For example, the query providing unit 121 can be connected to an input unit into which a user can input the request queries. However, the request queries can also be provided as part of a request from another computing system, for instance, from the enterprise control system 110 that can communicate respective request queries to the query providing unit 121 which is then adapted for providing the same. A respective request query indicates respective requested time-dependent data values of a time-series data set that shall be retrieved from the process database system 131. In particular, the requested time-dependent data values that shall be retrieved can be indicated by the respective request query by indicating a respective request tag associated with the respective time-dependent data values that shall be retrieved and further by indicating a respective time period for which the time-dependent data values shall be retrieved. The respective time period can be indicated, for instance, by providing a respective start time and a respective end time of the respective time-dependent data values, wherein the start time and end time can indicate the timestamps correlated with time-dependent data values between which all time-dependent data values shall be retrieved. However, alternatively also a respective start time and a time duration starting from the respective start time can be provided or a respective end time and a time duration backward from the respective end time can be provided to indicate the time period for which time-dependent data values shall be retrieved. Generally, a plurality of request queries is provided by the query providing unit 121.

The responsiveness score providing unit 122 is then adapted to provide responsiveness scores of the process database system 131 for the provided request queries. For example, the responsiveness score providing unit 122 can be adapted to provide the responsiveness scores by retrieving the responsiveness scores from the persistency database 140 and providing the same. The persistency database 140 can be adapted to store a plurality of responsiveness scores, wherein each responsiveness score is associated with a respective tag. A respective responsiveness score is indicative of an expected responsiveness of the process database system 131 with respect to the respective tag with which it is associated. In a preferred embodiment, the responsiveness score refers to a data density of the time-series data set associated with the respective tag, wherein a higher data density indicates an expected higher responsiveness of the process database system than a lower data density. The applicant has realized that the responsiveness of the process database system, i.e. the response time, is linearly related to the amount of time-dependent data values that are retrieved. Since the amount of time-dependent data values that are retrieved is directly related to the data density, in a fixed query time frame, a higher data density results in an increased response time, and thus indicates a higher responsiveness score. However, in another embodiment additionally or alternatively the responsiveness score can refer to a synchronization state of a time-series data set associated with the respective tag. Generally, the synchronization state of a respective time-series data set is indicative of which time-dependent data values of the time-series data set have already been retrieved from the process database system 131. For example, the synchronization state can refer to an end time of a previous request query for which the time-dependent data values have already been retrieved. Thus, the synchronization state is indicative of how many time-dependent data values of a time-series data set have still to be retrieved. Accordingly, a synchronization state indicating a higher amount of time-dependent data values for a time-series data set associated with the tag indicates a lower responsiveness of the process database system 131 with respect to this tag, whereas a synchronization state indicating a lower amount of time-dependent data values that shall be retrieved indicates a higher responsiveness of the process database system 131. Moreover, the responsiveness score can also be determined from actual measurements of the responsiveness of the process database system 131 with respect to a specific tag. For example, during a retrieval of time-dependent data values associated with a respective tag during a previous retrieval of data from the process database system 131, the amount of respective time-dependent data values associated with the tag retrieved during a predetermined time period, for instance, retrieved during a minute, ten minutes, an hour, etc., can be measured. This measured amount of time-dependent data values retrieved during the predetermined time period can then be regarded as a responsiveness score associated with the respective tag, wherein the higher the responsiveness score in this case the higher the responsiveness of the process database system 131 with respect to the respective tag. The responsiveness score provided by the responsiveness score providing unit 122, for instance, from the persistency database 140, can then be provided to the bulk query generating unit 123.

The bulk query generating unit 123 is then adapted to generate bulk queries based on the responsiveness scores. In particular, the bulk queries are generated such that a respective bulk query comprises queries for requesting at least a part of the requested time-dependent data values of one or more of the provided request queries and further such that all requested time-dependent data values of all provided request queries are requested by the bulk queries. Moreover, it is preferred that the bulk queries are generated such that each bulk query comprises queries such that a pre-configurable maximum data point count is not exceeded during the retrieval of the time-dependent data values associated with the queries of the bulk query. A pre-configurable maximum data point count refers to the maximum amount of time-dependent data values that can, for instance, be retrieved from the process database system 131 in a query retrieval. Further, each query of a bulk query can generally only refer to time-dependent data values that are associated with one request tag. In the following, an exemplary embodiment on how the bulk queries can be generated by the bulk query generating unit 123 will be provided with respect to FIG. 3.

Figure 3:
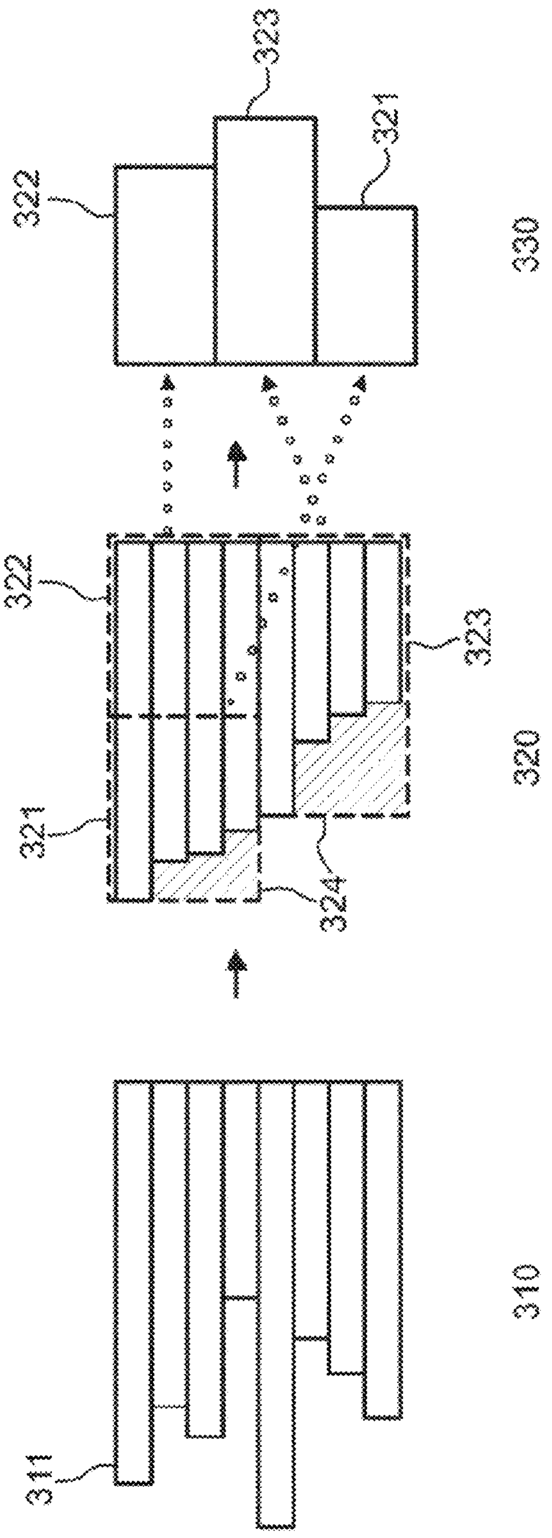
FIG. 3 shows a schematic flow chart exemplarily illustrating details of an embodiment of the method.

FIG. 3 shows in a first state 310 symbolically the time-dependent data values of a plurality of request queries. In particular, each bar, like bar 311, indicates the time-dependent data values associated with a tag, wherein the beginning of the bar indicates the start time of the request query and the end of the bar the end time of the request query. It is noted that in this example the end time of all request queries is the same, for instance, the end time can refer to a current time, i.e. to the most current time-dependent data value of a time-series data set. However, in other examples the end times of the different request queries can be different, wherein still the same principles can be applied. Accordingly, the state 310 shown in FIG. 3 refers schematically to the state in which the requested time-dependent data values are stored on the process database 131.

For generating the bulk queries, the bulk query generating unit 123 can then be adapted to sort the request queries in accordance with their start time leading to state 320 shown in FIG. 3. For instance, the sorting can be directly based on the start time or can be based on a synchronization state of the respective time-series data sets indicated by the request query. The sorting of the request queries allows for a much easier and faster generating of the bulk queries, since much simpler rules can be applied for generating the bulk queries based on the responsiveness scores. The generating of the bulk queries can then comprise applying predetermined rules for generating the bulk queries. For example, the rules can be further based on configurable partitioning parameters that indicate a general setup of each bulk query, for instance, a maximum number of queries and thus of request tags that can be associated with the bulk query, a maximum length of a query that can be associated with the bulk query, etc. Based on the sorted request queries shown in state 320, the bulk query generating unit 123 can then be adapted to generate the first bulk query 321 based on the responsiveness scores associated with the tags of the respective request queries by applying the predetermined rules and optionally by applying the configurable partitioning parameters. For example, in the state 320 the bulk query 321 is generated by first generating a query for the bulk query 321 corresponding to the tag of the first request query and with the start time of the first request query, but with an end time splitting the first request query into two parts. This can be based, for instance, on the partitioning parameters that indicate a maximum length for each query of a bulk query that shall not be exceeded. Moreover, if in a previous retrieving of requested time-dependent data values a bulk query has failed, for instance, due to a process timeout, the failed bulk query can for a retry retrieval be split, i.e. provided with end times of the queries that split the bulk query, and then provided as two bulk queries again to the process database system. Then, the bulk query generating unit 123 can be adapted to generate a next query for the bulk query 321 associated with the next request query, i.e. the next request tag, and so on. Preferably, as shown in this example, all queries generated for generating a bulk query 321, 322, 323 comprise the same start time and optionally the same end time. Accordingly, for retrieving time-dependent data values of request queries that have a start time after the start time of at least one other request query for which the time-dependent data values are requested in a bulk query 321, 322, 323, the query of the bulk query requesting these time-dependent data values has another start time than the respective request query. This leads to the retrieval of duplicated data 324 which refers to time-dependent data values that have already been retrieved with respect to a previous request query and thus are already provided, for instance, to the enterprise control system 110 as part of a previous retrieval of time-dependent data values. However, generating all queries of a bulk query 321, 322, 323 with the same start and optionally the same end time has the advantage that the generating of the bulk queries is less computationally extensive and that the time-dependent data values of the bulk queries can be retrieved more effectively. Accordingly, as shown in state 320, from the request queries three different bulk queries 321, 322, 323 are generated, wherein two bulk queries 321, 323 comprise duplicated time-dependent data values 324.

After the bulk queries have been generated, the transmitting unit 124 can be adapted to transmit the bulk queries 321, 322, 323 to the process database system 131. The retrieving unit 125 is then adapted to retrieve the time-dependent data values associated with the bulk queries 321, 322, 323 from the process database system 131 in response to the bulk queries 321, 322, 323. For example, as shown in FIG. 3, the transmitting and/or retrieving can comprise a sorting of the bulk queries 321, 322, 323 in accordance with the computational possibilities of the process database system 131. For example, as shown in FIG. 3, the process database system 131 can be adapted to process a plurality of bulk queries in parallel, as shown in state 330, wherein the bulk queries 321, 322, 323 can then be sorted into the respective parallel processing lanes of the process database system 131, for instance, further based on a current processing and capacity state of the process database system 131. If the retrieved time-dependent data values are known to comprise duplicated time-dependent data values, before providing the retrieved time-dependent data values, for instance, to the enterprise control system 110, the known duplicated retrieved time-dependent data values can be removed. For example, a start time of the currently retrieved time-dependent data values associated with the respective tag can be compared with an end time of already retrieved time-dependent data values and currently retrieved time-dependent data values between the start time and the end time can be removed, since they very likely refer to duplicated time-dependent data values. The retrieved time-dependent data values can then be further processed or stored, for instance, by the enterprise control system 110.

Figure 2:
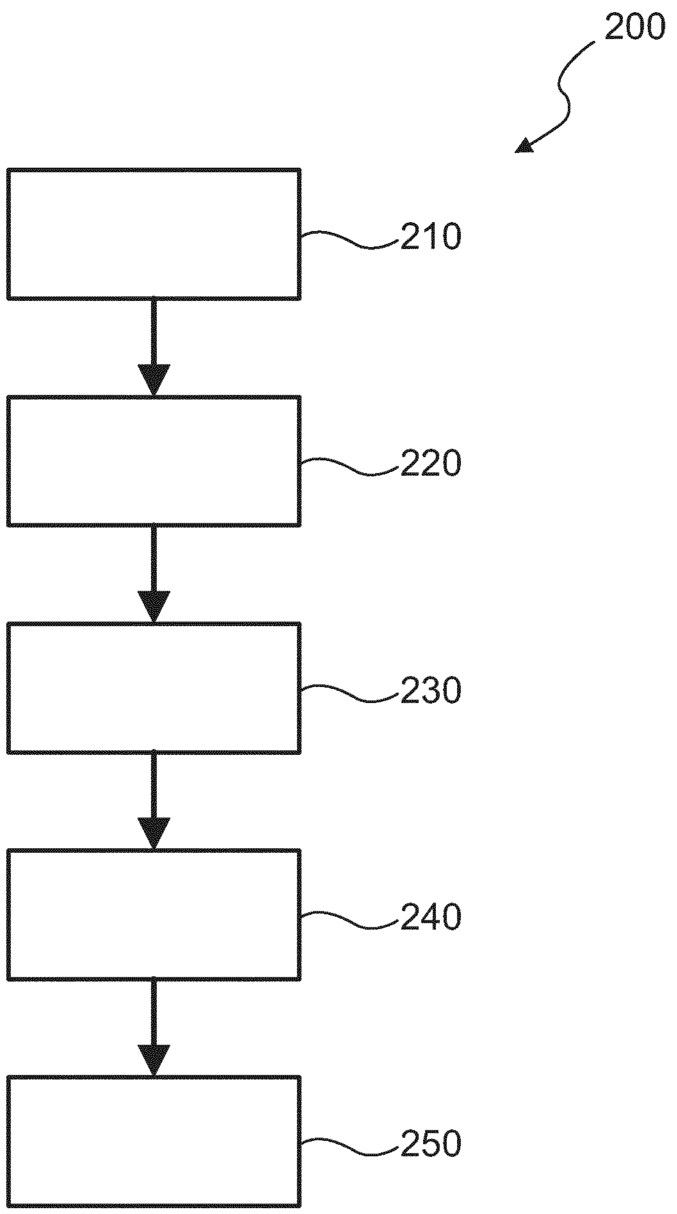
FIG. 2 shows a flow chart exemplarily illustrating an embodiment of a method for retrieving time-series data sets from a process database system of an industrial plant.

FIG. 2 shows schematically and exemplarily a computer implemented method 200 for retrieving time-series data sets from a process database system 131 of the industrial plant 130. In a first step 210, the method 200 comprises providing request queries for requesting time-dependent data values of time-series data sets. In particular, the providing of the request queries can be performed in accordance with the above description with respect to the request queries providing unit 121. In a next step 220, the method 200 comprises providing responsiveness scores of the process database system 131 for the provided request queries, for instance, also in accordance with the principles and methods described with respect to the responsiveness score providing unit 122. In a third step 230, bulk queries are generated based on the responsiveness scores such that a) a respective bulk query comprises queries for requesting at least a part of the requested time-dependent data values of one or more of the provided request queries and b) all requested time-dependent data values of all provided request queries are requested by the bulk queries. Also this step can further be performed, for instance, in accordance with the principles described above with respect to the bulk query generating unit 123 and with respect to FIG. 3. In the following step 240, the bulk queries are transmitted to the process database system 131 and in step 250 the time-dependent data values are retrieved from the process database system 131 in response to the bulk queries, wherein the retrieved time-dependent data values can then be provided, for instance, to the enterprise control system 110.

Figure 4:
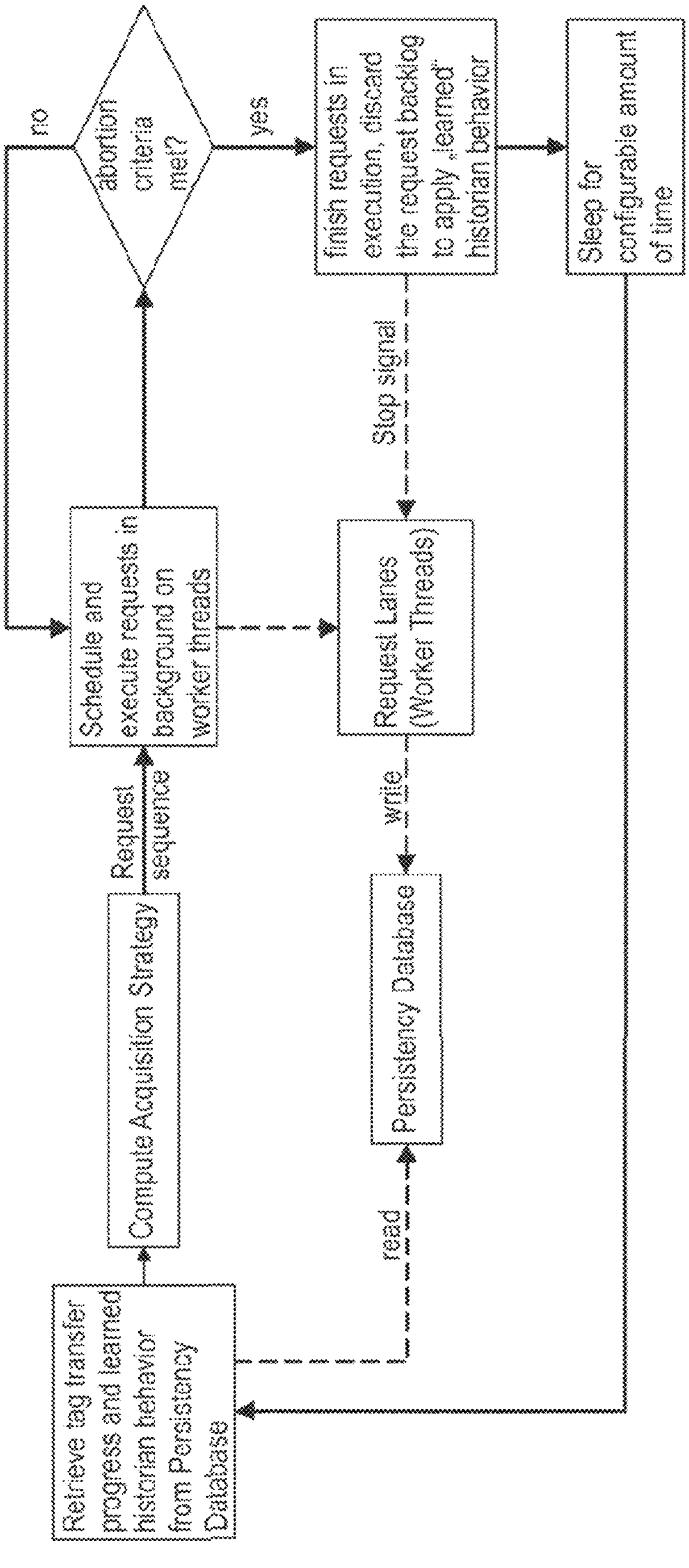
FIG. 4 shows exemplarily and schematically the integration of a method for retrieving time-series data sets from a process database system into a general workflow.

In the following, a further example for the integration of the method for retrieving time-series data sets from a process database system into a general workflow will be described with respect to FIG. 4. In a first step as shown in FIG. 4, a tag transfer progress, i.e. a synchronization state of a time-series data set associated with the tag, is retrieved together with a learned historian behaviour, i.e. a responsiveness score indicative of the responsiveness of the process database system, here named a “historian”, from the persistency database is retrieved. Based on the retrieved synchronization state, for instance, for each tag, a request query that requests all time-dependent data values that have not already been retrieved for this tag can be generated automatically. This is in particular advantageous in cases in which the time-dependent data values shall be retrieved as continuously as possible to keep, for instance, an enterprise control system 110 up to date. Thus, in the next step, an acquisition strategy can be computed, in particular, by generating bulk queries based on the generated request queries and the retrieved responsiveness score which here refers to the measured, i.e. learned, responsiveness of the process database system with respect to a specific tag. The bulk queries are then provided to the process database system, wherein the providing can comprise a sequencing of the bulk queries. Moreover, the retrieving of the time-dependent data values of the bulk queries can then comprise in this example further a scheduling and executing of the bulk queries, i.e. bulk requests, with respect to a background of worker threads provided by the process database system. The scheduling and executing of the bulk requests is then performed until a predetermined abortion criterion is met. For example, the abortion criterion can refer to a completion of the retrieval of the time-dependent data values associated with the bulk requests, or can refer to a failure code indicating that a retrieval of time-dependent data values of a bulk request has failed. If the abortion criterion is met, for instance, that the bulk requests in execution are finished, the bulk query backlog is discarded to apply a learned historian behaviour. This means, for instance, that the responsiveness scores utilized to generate the bulk queries for the current query cycle are updated with more current responsiveness scores, for instance, responsiveness scores that have been measured during the current query cycle. The process can after that then be adapted to sleep for a configurable amount of time, for instance, to allow for requests from other systems on the process database system and can then start anew with retrieving a synchronization state and a responsiveness score. With respect to the responsiveness score during the execution of the bulk query and/or after the finish of the execution of the bulk query, the request lanes, i.e. work threads, of the process database system that are associated with the bulk query can be monitored and an amount of time-dependent data values retrieved from the process database system in a predetermined time period with respect to each tag can be determined. The amount of time-dependent data values that are retrieved in association with a tag can then be stored as a responsiveness score on the persistency database from which this learned responsiveness score can be retrieved for generating the next bulk queries.

Generally, in this invention a request query is defined as a request with a certain start time, end time and request tag. In this case, a system can be programmed that stores data synchronization states in a database. Further, the system can be programmed to continuously read the previously stored synchronization states from the database and to measure the data densities of respective tags for which the synchronization states show that retrieved data is not up to date. The measured data density can be regarded as referring to a responsiveness score of the respective tags. In a next step, a sequence of optimal queries, i.e. bulk queries, can be computed based on the measured data densities, e.g. responsiveness scores, using an optimization heuristic. The sequence of optimal queries can then be implemented with a certain parallelism, also considering current process database system load and past misbehavior/malfunctions. Optionally, the system can be programmed to react to failed requests, i.e. bulk queries, in an intelligent fashion, e.g. by identifying the failure reason and deciding about an appropriate mitigation strategy. Further, it is preferred that the system continuously learns and thus updates its acquisition strategy computation method, i.e. the rules utilized to generate the bulk queries, accordingly, e.g. notices sudden increases in data densities, and stores this information in a database for persistency.

Although in the above embodiments the retrieved time-dependent data values are provided to an enterprise control system, in other embodiments the retrieved time-dependent data values can be provided to any other computer system or storage for further storage and processing. For example, the retrieved time-dependent data values can be statistically processed for obtaining a statistical overview over the processes performed by an industrial plant.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutual different dependent claims does not indicate that a combination of these measures cannot be used to advantage.

Procedures like the providing of the request queries, the providing of the responsiveness score, the generating of the bulk queries, the transmitting of the bulk queries, the retrieval of the time-dependent data values, etc., performed by one or several units or devices can be performed by any other number of units or devices. These procedures can be implemented as program code means of a computer program and/or as dedicated hardware.

A computer program product may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention refers to a method for retrieving time-series data sets from a database system of an industrial plant. The method comprises providing request queries indicative of time-dependent data values by indicating a tag and a start time and end time of the respective time-series data set, and providing responsiveness scores for the provided request queries, wherein a respective responsiveness score is indicative of an expected responsiveness of the process database system with respect to a tag. Further, bulk queries are generated based on the responsiveness scores comprising queries for requesting at least a part of the time-dependent data values, wherein all time-dependent data values of all provided request queries are requested by the bulk queries. The bulk queries are transmitted, and the time-dependent data values are retrieved from the process database system. This allows for an effective and computationally inexpensive retrieval of data.

The invention claimed is:

1. A computer implemented method for retrieving time-series data sets from a process database system of an industrial plant, wherein a respective time-series data set is associated with a respective tag and comprises a respective series of time-dependent data values, wherein the method comprises:

providing request queries for requesting time-dependent data values of the time-series data sets, wherein a respective request query indicates respective requested time-dependent data values by indicating a) a respective request tag associated with a respective time-series data set and b) a respective start time and a respective end time of the time-dependent data values of the respective time-series data set associated with the respective request tag, providing responsiveness scores of the process database system for the provided request queries, wherein a respective responsiveness score indicates an expected amount of time-dependent data values of the respective tag that are retrieved from the process database system during a predetermined time period and the responsiveness score is determined from at least one of: (i) a synchronization state of the respective request tag, (ii) a data density of a time-series data set associated with the respective tag, and (iii) a measured amount of time-dependent data values associated with the respective request tag that were retrieved during a predetermined time period in a prior retrieval, and wherein responsiveness scores determined by measurement are stored in a persistency databases associated with the respective tags for use with future request queries, generating bulk queries based on the responsiveness scores such that a) a respective bulk query comprises queries for requesting at least a part of the requested time-dependent data values of one or more of the provided request queries and b) all requested time-dependent data values of all provided request queries are requested by the bulk queries, identifying a plurality of parallel processing lanes of the process database system, wherein the plurality of parallel processing lanes are each associated with a current capacity, transmitting one or more portions of the bulk queries to a parallel processing lane of the plurality of the parallel processing lanes of the process database system based on the current capacity of the parallel processing lane, and retrieving time-dependent data values from the process database system in response to the bulk queries.

2. The method according to claim 1, wherein a respective responsiveness score is determined based on a synchronization state of a respective request tag or a data density of a time-series data set associated with the respective request tag.

3. The method according to claim 1, wherein the generating of the bulk queries comprises determining, for each bulk query, queries comprising at least a part of the time-dependent data values indicated by the request queries such that a pre-configurable maximum data point count is not exceeded during the retrieving of the time-dependent data values of the bulk query.

4. The method according to claim 1, wherein the generating of a bulk query comprises determining the queries of a bulk query such that all determined queries of the bulk query comprise the same start time.

5. The method according to claim 4, wherein the start time of the determined queries of a bulk query is determined such that for at least one request query duplicated time-dependent data values are retrieved when retrieving the time-dependent data values in response to the bulk query.

6. The method according to claim 5, wherein the method further comprises, after retrieving the time-dependent data values in response to the bulk queries comprising duplicated time-dependent data values for at least on request query, deduplicating the retrieved time-dependent data values of the request query.

7. The method according to claim 1, wherein the generating of the bulk queries is further based on configurable partitioning parameters determining a general setup of each bulk query.

8. The method according to claim 7, wherein the configurable partitioning parameters indicate at least one of a number of request tags that are requestable by a bulk query and a maximum time frame for a request tag requestable by a bulk query.

9. The method according to claim 1, wherein the method further comprises determining the responsiveness score for a request tag associated with a request query, for which time-dependent data values are retrieved, during or after the retrieving of the time-dependent data values and storing the responsiveness score to be used for future request queries requesting the request tag.

10. The method according to claim 9, wherein the responsiveness score is determined by measuring an amount of time-dependent data values associated with the request tag that are retrieved in a predetermined time period during the retrieval of the time-dependent data values of the request tag.

11. The method according to claim 1, wherein the method further comprises determining a request start time of a request query based on a synchronization state of the request tag indicated by the request query.

12. The method according to claim 1, wherein the method further comprises determining, during the retrieving of the time-dependent data values of the bulk queries, whether a failure has occurred, wherein, when it is determined that a failure has occurred that is associated with at least one query of the bulk queries, the method comprises providing the time-dependent data values requested by the query as new requested query to the step of determining a bulk query.

13. A computing device for retrieving time-series data sets from a process database system of an industrial plant, wherein a respective time-series data set is associated with a respective tag and comprises a respective series of time-dependent data values, wherein the computing device comprises:

a query providing unit for providing request queries for requesting time-dependent data values of the time-series data sets, wherein a respective request query indicates respective requested time-dependent data values by indicating a) a respective request tag associated with a respective time-series data set and b) a respective start time and a respective end time of the time-dependent data values of the respective time-series data set associated with the respective request tag, a responsiveness score providing unit for providing responsiveness scores of the process database system for the provided request queries, wherein a respective responsiveness score indicates an expected amount of time-dependent data values of the respective tag that are retrieved from the process database system during a predetermined time period and the responsiveness score is determined from at least one of: (i) a synchronization state of the respective request tag, (ii) a data density of a time-series data set associated with the respective tag, and (iii) a measured amount of time-dependent data values associated with the respective request tag that were retrieved during a predetermined time period in a prior retrieval, and wherein responsiveness scores determined by measurement are stored in a persistency databases associated with the respective tags for use with future request queries, a bulk query generating unit for generating bulk queries based on the responsiveness scores such that a) a respective bulk query comprises queries for requesting at least a part of the requested time-dependent data values of one or more of the provided request queries and b) all requested time-dependent data values of all provided request queries are requested by the bulk queries, a transmitting unit for:

identifying a plurality of parallel processing lanes of the process database system, wherein the plurality of parallel processing lanes are each associated with a current capacity, and transmitting one or more portions of the bulk queries to a parallel processing lane of the plurality of the parallel processing lanes of the process database system based on the current capacity of the parallel processing lane, and a retrieving unit for retrieving time-dependent data values from the process database system in response to the bulk queries.

14. A data retrieval system in connection with a process database system, wherein the data retrieval system comprises:

a persistency database adapted for storing a plurality of responsiveness scores of the process database system, wherein each responsiveness score is associated with a tag, and a computing device according to claim 13, wherein the query providing unit is adapted to receive the responsiveness score from the persistency database and to provide the received responsiveness score.

15. A computer program product for retrieving time-series data sets from a process database system of an industrial plant, wherein the computer program product comprises program code means causing a computing device to execute a method according to claim 1.

* * * * *